(12) United States Patent
Misgeld et al.

(10) Patent No.: US 11,655,002 B2
(45) Date of Patent: May 23, 2023

(54) ELECTRIC PEDELEC BOTTOM BRACKET DRIVE

(71) Applicant: SRAM, LLC, Chicago, IL (US)

(72) Inventors: Berno Johannes Engelbert Misgeld, Neuss (DE); Dietmar Greven, Dormagen (DE)

(73) Assignee: SRAM, LLC

( * ) Notice: Subject to any disclaimer, the term of this patent is extended or adjusted under 35 U.S.C. 154(b) by 166 days.

(21) Appl. No.: 17/280,262

(22) PCT Filed: Sep. 10, 2019

(86) PCT No.: PCT/EP2019/074090
§ 371 (c)(1),
(2) Date: Mar. 26, 2021

(87) PCT Pub. No.: WO2020/064324
PCT Pub. Date: Apr. 2, 2020

(65) Prior Publication Data
US 2022/0048593 A1 Feb. 17, 2022

(30) Foreign Application Priority Data
Sep. 28, 2018 (EP) ..................... 18197558

(51) Int. Cl.
*B62M 6/55* (2010.01)
*B62J 45/411* (2020.01)
(Continued)

(52) U.S. Cl.
CPC .............. *B62M 6/55* (2013.01); *B62J 45/411* (2020.02); *B62J 45/4152* (2020.02); *B62M 6/50* (2013.01)

(58) Field of Classification Search
CPC ... B62M 6/55; B62M 6/45; B62M 6/50; B62J 45/4152; B62J 45/411; B62J 45/421; F16H 59/78
See application file for complete search history.

(56) References Cited

U.S. PATENT DOCUMENTS 11,180,216 B2 * 11/2021 Greven ................... B62M 6/45
2013/0049549 A1    2/2013 Fölmli et al.
(Continued)

FOREIGN PATENT DOCUMENTS

WO    WO-2012095528 A2 *  7/2012  ............ B60L 11/007
WO    WO-2017037488 A1 *  3/2017  .............. B62M 6/40

*Primary Examiner* — Anne Marie M Boehler
(74) *Attorney, Agent, or Firm* — Norman B. Thot

(57) ABSTRACT

An electric pedelec bottom bracket drive includes a drive unit, a drive controller, and an ambient temperature detector. The drive unit includes a drive unit housing, a drive motor arranged therein, and a housing temperature sensor which measures a housing temperature. The drive controller supplies electrical drive energy to the drive motor and includes a housing temperature control module which is connected to the housing temperature sensor and which controls an electrical drive energy to not exceed a housing limit temperature. The ambient temperature detector is arranged to detect an air temperature outside of the drive unit housing and is connected to the housing temperature control module. The housing temperature control module limits a maximum electrical drive energy as a function of the air temperature when the housing temperature measured by the housing temperature sensor is above a control intervention limit temperature which is below the housing limit temperature.

8 Claims, 3 Drawing Sheets

(51) Int. Cl.
*B62J 45/415* (2020.01)
*B62M 6/50* (2010.01)

(56) References Cited

U.S. PATENT DOCUMENTS

| | | | |
|---|---|---|---|
| 2016/0375957 A1 | 12/2016 | Hashimoto et al. | |
| 2018/0170212 A1* | 6/2018 | Liu | B60W 10/08 |
| 2018/0257743 A1* | 9/2018 | Tsuchizawa | B62J 45/415 |
| 2019/0176930 A1* | 6/2019 | Wiegel | F16D 41/24 |
| 2019/0329840 A1* | 10/2019 | Jager | B62J 50/21 |
| 2021/0009226 A1* | 1/2021 | Yamamoto | G06N 3/006 |
| 2021/0394863 A1* | 12/2021 | Stahl | B62M 6/50 |
| 2022/0161890 A1* | 5/2022 | Earle | B62J 45/413 |
| 2022/0355897 A1* | 11/2022 | Baumgaertner | B62J 45/411 |

* cited by examiner

ELECTRIC PEDELEC BOTTOM BRACKET DRIVE

CROSS REFERENCE TO PRIOR APPLICATIONS

This application is a U.S. National Phase application under 35 U.S.C. § 371 of International Application No. PCT/EP2019/074090, filed on Sep. 10, 2019 and which claims benefit to European Patent Application No. 18197558.2, filed on Sep. 28, 2018. The International Application was published in German on Apr. 2, 2020 as WO 2020/064324 A1 under PCT Article 21(2).

FIELD

The present invention relates to an electric pedelec bottom bracket drive for a bicycle.

BACKGROUND

A pedelec bottom bracket drive operates in a purely assistive manner, i.e., it is only assistively active when the bicycle rider performs a pedaling action. The bottom bracket drive has a drive unit with an electric drive motor in a drive unit housing. In contrast to bicycle hub drives, the upper temperature of the drive unit housing must be limited for a bottom bracket drive in order to prevent skin burns to the extent skin contacts the drive unit housing. Legal regulations in Germany require, for example, that the housing temperature not exceed a temperature limit of 60° C.

Previously described pedelec bottom bracket drives are equipped with drive controls and with a temperature sensor which are provided within the drive unit housing to, for example, step-by-step limit the maximum available drive energy as the housing limit temperature is approached based to a fixed scheme.

In the case of a sporting control scheme that only intervenes shortly before the limit temperature is reached, it is therefore possible that the housing temperature reaches the limit temperature so that no more motor drive energy is suddenly available at all. The limit temperature is usually not reached with a conservatively designed control scheme that intervenes with restraint even at relatively low housing temperatures, however, supporting motor drive energy is thereby also squandered.

SUMMARY

An aspect of the present invention is to provide an electric pedelec bottom bracket drive with an improved housing temperature control module.

In an embodiment, the present invention provides an electric pedelec bottom bracket drive for a bicycle. The electric pedelec bottom bracket drive includes a drive unit, a drive controller, and an ambient temperature detector. The drive unit comprises a drive unit housing, a supporting electric drive motor arranged in the drive unit housing, and a housing temperature sensor which is thermally associated with the drive unit housing. The housing temperature sensor is configured to measure a housing temperature. The drive controller is configured to supply electrical drive energy to the supporting electric drive motor. The drive controller comprises a housing temperature control module which is connected to the housing temperature sensor and which is configured to control an electrical drive energy so that a housing limit temperature is not exceeded. The ambient temperature detector is arranged outside of the drive unit housing and is connected to the housing temperature control module. The ambient temperature detector is configured to detect an air temperature outside the drive unit housing. The housing temperature control module is configured to limit a maximum electrical drive energy as a function of the air temperature when the housing temperature measured by the housing temperature sensor is above a control intervention limit temperature which is below the housing limit temperature.

BRIEF DESCRIPTION OF THE DRAWINGS

The present invention is described in greater detail below on the basis of embodiments and of the drawings in which.

DETAILED DESCRIPTION

Figure 1:
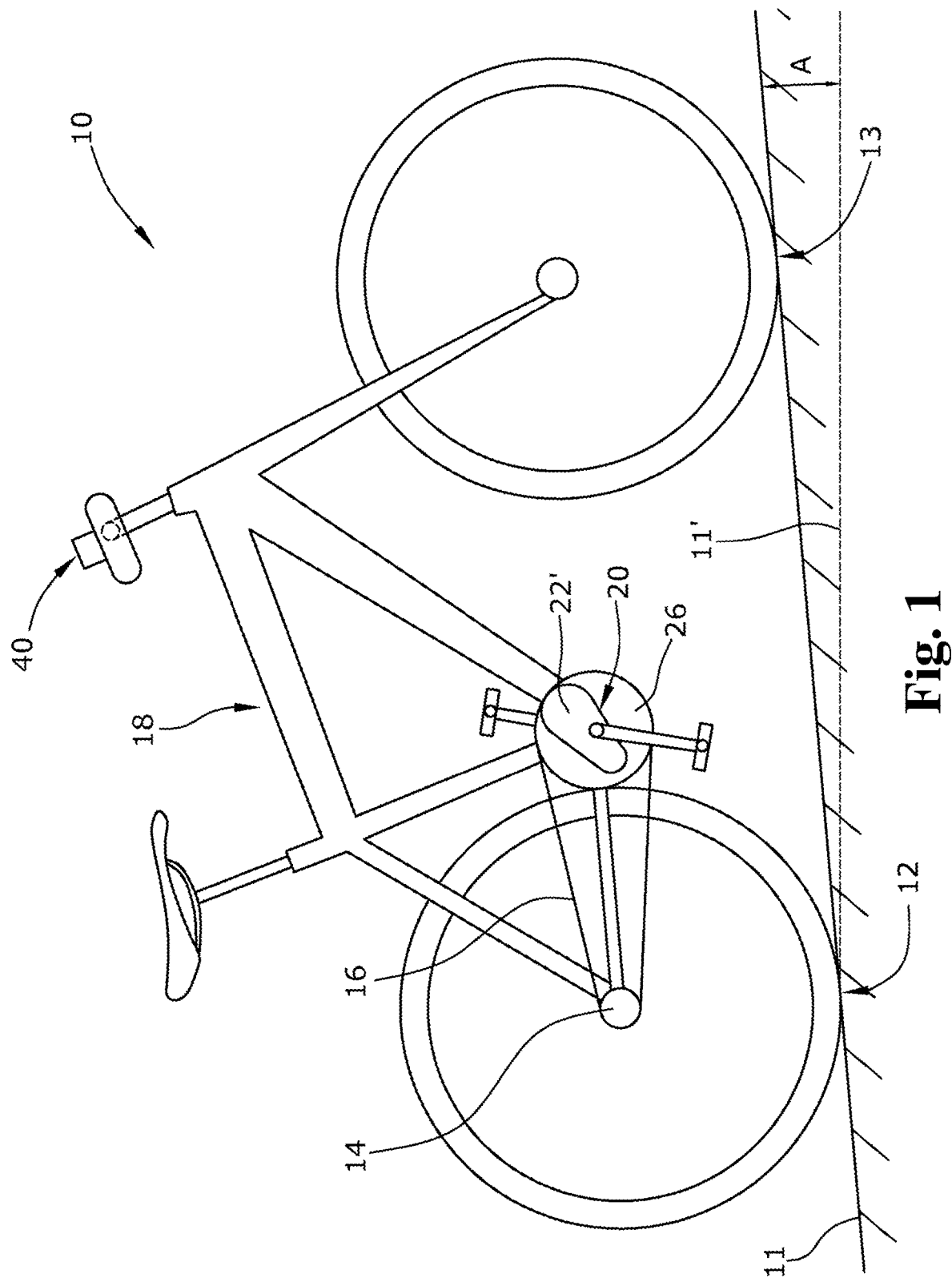
FIG. 1 schematically shows a bicycle with an electric pedelec bottom bracket drive and a control unit at the bicycle handlebars.

The electric pedelec bottom bracket drive has a drive unit with a supporting electric drive motor in a drive unit housing. A housing temperature sensor is thermally associated to the drive unit housing which accurately determines the housing temperature. The housing temperature sensor can, for example, be mounted directly on the inside of the drive unit housing. The drive unit housing can, for example, be made of metal, and can, for example, have cooling fins on the outside thereof. The housing temperature sensor is in particular attached to a side wall of the drive unit housing that lies approximately in the longitudinal plane of the bicycle and is adjacent to or faces a pedal crank.

A drive control unit is provided with the bottom bracket drive, which supplies the drive motor with electrical energy, i.e., it can in particular comprise control electronics and energy electronics. The drive control is not necessarily arranged within the drive unit housing, but can, for example, be arranged within the drive unit housing. The control electronics can in particular be alternatively arranged in a separate control unit outside the drive unit housing which can, for example, be attached to the bicycle handlebars.

The current electrical drive energy is generally controlled with a basic control according to a fixed rule, for example, via an algorithm. The fixed rule of the basic control may, for example, define a simple proportional relationship between the pedaling energy of the rider and the drive energy of the drive motor. The proportionality factor may be adjustable stepwise or continuously via a control unit. The generally available maximum drive energy of the drive motor is, however, always limited to, for example, 250 W.

The drive control is provided with a housing temperature control module which is informationally connected to the housing temperature sensor via a signal connection and which controls and limits the electrical drive energy so that the actual housing temperature does not exceed a constant housing limit temperature Tmax. The housing limit temperature Tmax can, for example, be approximately 60° C.

An ambient temperature detector is provided outside the drive unit housing which signalizes or detects the local air temperature outside the drive unit housing and which is informationally connected to the housing temperature control module via a signal connection. The ambient temperature detector can generally also be located outside the bicycle. The local ambient temperature can, for example, be received wirelessly via a third device and/or from the Internet.

The ambient temperature detector can, for example, be provided as a temperature sensor on the bicycle and can, for example, be arranged in or on a separate control unit. The housing temperature control module is thus always aware of the local ambient air temperature Tair outside the drive unit housing.

The housing temperature control module limits the maximum electrical drive energy Emax as a function of the local ambient air temperature Tair if and as long as the housing temperature Th signalized by the housing temperature detector is above the control intervention limit temperature Tr. The control intervention limit temperature Tr is below the housing limit temperature Tmax.

The limitation of the electrical drive energy to a temporary maximum when approaching the housing limit temperature Tmax is therefore not carried out according to a rigid scheme, but as a function of the local ambient air temperature Tair. This is because at low air temperature, the cooling energy via the drive unit housing, which is air-cooled by the ambient air, is considerably higher than at relatively high air temperatures. At a low local ambient air temperature Tair, a higher maximum electrical drive energy Emax is permitted than at relatively high air temperature. This means that significantly more maximum electrical drive energy Emax is available than with a rigid conservative control, in particular at relatively low ambient temperatures.

The limitation of the maximum electrical drive energy only occurs, however, if the housing temperature Th measured by the housing temperature detector is above a control intervention limit temperature Tr that is lower than the housing limit temperature Tmax. The housing limit temperature Tmax can, for example, be above 50° C., and is in particular about 60° C. The control intervention limit temperature Tr can, for example, be at least 5 K below the housing limit temperature Tmax, for example, at least 10 K below the housing limit temperature Tmax. The control system calculates the future temperature course taking into account a dynamic model which includes the outside temperature and, for example, the bicycle speed. The control decides in each time step whether an intervention is necessary to limit the energy based on the future temperature course.

The control intervention limit temperature Tr need not necessarily be constant, but can be set variably, in particular depending on the local ambient air temperature Tair. The setting of the maximum electrical drive energy Emax according to the present invention as a function of the local ambient air temperature Tair can thus also be realized by increasing the control intervention limit temperature Tr at low local ambient air temperatures Tair and by decreasing the control intervention limit temperature Tr at high local ambient air temperatures Tair. The course of the correlation between the housing temperature Th and the maximum electrical drive energy Emax can additionally or alternatively also be adjusted as a function of the local ambient air temperature Tair.

An inclination sensor can, for example, be provided which indicates the inclination A of the drive unit to the horizontal plane in the longitudinal direction of the bicycle. The inclination sensor can, for example, be arranged inside the drive unit housing or is in any case spatially fixed thereto or attached thereto. The inclination sensor is used to determine the extent to which the bicycle having the bottom bracket drive is travelling upwards or downwards. The housing temperature control module is informationally connected to the inclination sensor via a signal connection and limits the maximum electrical drive energy Emax as a function of the inclination A of the drive unit or the bicycle to the horizontal plane as signalized by the inclination sensor. The control intervention limit temperature Tr can, for example, be lowered in the event of an ascent, but raised in the event of a descent. In particular during an ascent, this increases the probability that a complete shutdown of the drive motor can be avoided, which shutdown is perceived as most unpleasant.

In an embodiment of the present invention, a location receiver, for example a GPS receiver, and a trip profile memory can, for example, be provided, in which the future trip altitude profile is stored, which is continuously redetermined on the basis of a previously performed destination input and the current location. The housing temperature control module can more accurately estimate the energy requirements of the drive unit and drive motor for the following minutes from the future altitude profile. The altitude profile can in particular be used to relatively accurately determine when a high energy demand is expected to end, for example, during an ascent. The control module is thus enabled to estimate the time course of the development of the housing temperature and can therefore set the maximum electrical drive energy at a level that the housing limit temperature is or will be reached approximately exactly as soon as the phase of a relatively high energy demand will be followed by a phase of a relatively low energy demand. With the help of the future or upcoming height profile, the housing temperature control module can thus limit the maximum electrical drive energy Emax over time so that the housing temperature Th, to the extent necessary, approximately reaches the housing limit temperature, while avoiding a massive reduction of the maximum electrical drive energy Emax. The housing temperature-related interventions in the available electrical drive energy can therefore be kept relatively small, which improves the subjective riding experience.

The drive unit can, for example, have a pedal shaft torque sensor and a rider pedal energy monitor in which a pedal energy history is stored. The pedaling energy is continuously recorded based on the pedal shaft speed and the pedal shaft torque so that information is available about the maximum pedaling energy that can be expected in future minutes. The average rider pedaling energy of the earlier minutes is simply extrapolated into the future in the simplest case.

The housing temperature control module is connected to the pedaling energy monitor and limits the maximum electrical drive energy Emax depending on the pedaling energy history. For example, if the expected future rider pedaling energy is relatively low, together with the future altitude profile, the maximum electrical drive energy Emax can be limited in a relatively restrained manner, even at relatively high housing temperatures Th, without the risk that massive intervention in the maximum electrical drive energy is then required because the housing limit temperature Tmax is reached.

In an embodiment, a bicycle speed detector can, for example, be provided to signalize the current bicycle speed V. The housing temperature control module can then additionally limit the maximum drive energy as a function of the bicycle speed V. The cooling performance is relatively high at high bicycle speed V so that the maximum electrical drive energy Emax can also be limited to a relatively high level.

An embodiment of the present invention is explained in greater detail below under reference to the drawings.

FIG. 1 schematically shows a bicycle 10 which has a pedelec bottom bracket drive on its bicycle frame 18, which is essentially defined by a bottom bracket drive unit 20 and a control unit 40 at the bicycle handlebars. The drive unit 20 is arranged in the region of a pedal shaft 25 and partially accommodates the pedal shaft 25. Pedal cranks 241, 242 are attached to the end of the pedal shaft 25 which have a pedal at their distal end, respectively. A chainring 26 is driven by the drive unit 20, through which a rear sprocket 14 is mechanically driven via a bicycle chain 16, through which the rear wheel 12 of the bicycle 10 is actuated. The bicycle 10 also has a non-driven front wheel 13.

The bicycle 10 in FIG. 1 is standing with its two wheels 12, 13, as seen in the direction of travel, on a contact plane 11 which is inclined at an angle A to the horizontal plane 11'. The forward-moving bicycle 10 is therefore on an incline in FIG. 1.

Figure 2:
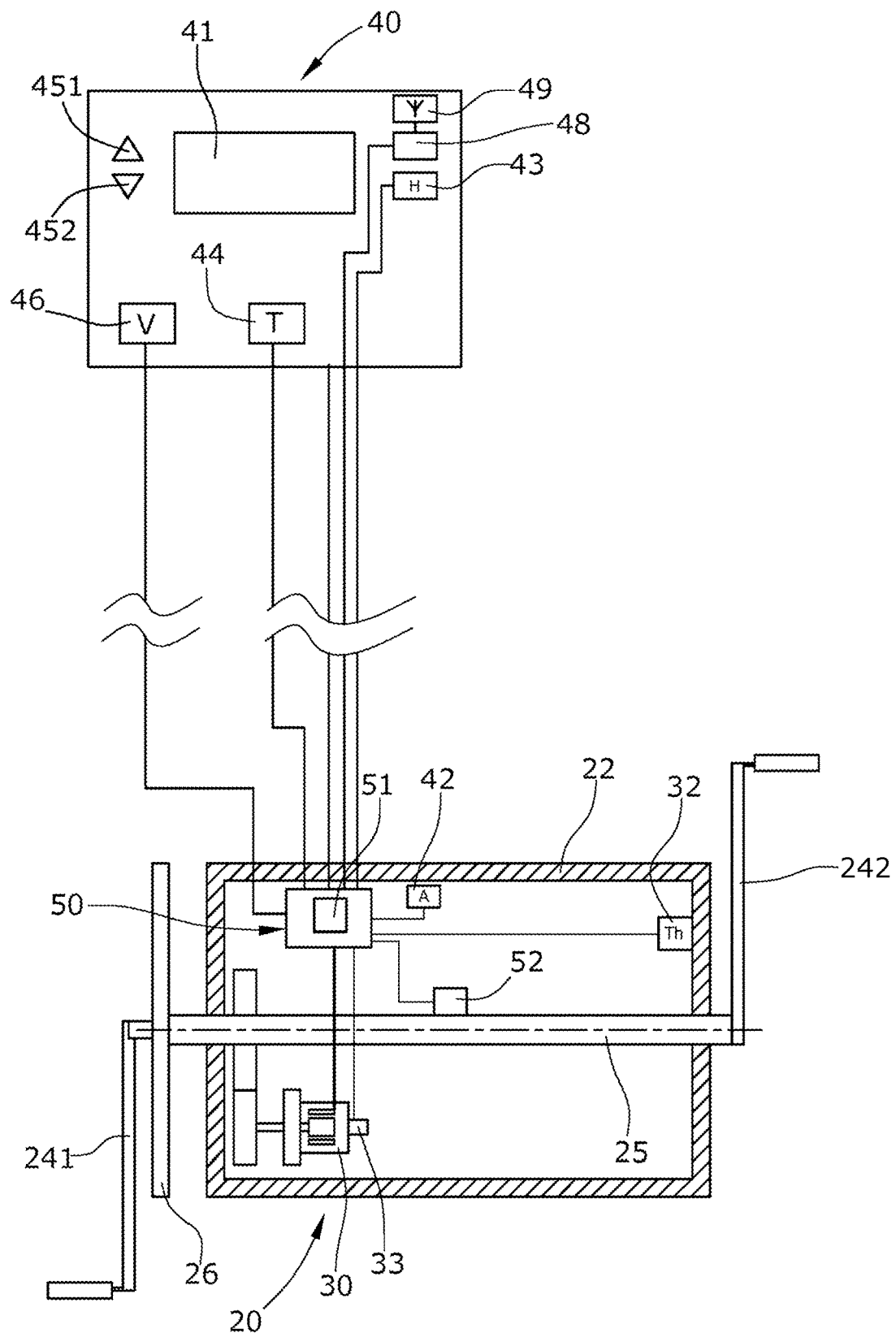
FIG. 2 schematically shows the control unit and a drive unit of the bottom bracket drive of FIG. 1.

The drive unit 20 shown in FIG. 2 comprises a metal drive unit housing 22, an electric drive motor 30 disposed within the drive unit housing 22, a plurality of sensors 32, 33, 42, 52, and an electronic and programmable or programmed drive control 50. A housing temperature control module 51 is arranged in the drive control 50, which is present as hardware, but in the present case predominantly as software in the form of an executable program.

The drive motor 30 drives the chainring 26 via a gearbox. The drive motor 30 is supplied with electrical energy by the drive control 50, which controls and regulates the drive motor 30 accordingly. A fixed pedal shaft torque sensor 52 is associated with the pedal shaft 25. The pedal shaft torque sensor detects the torque applied to the pedal shaft 25 by the rider and the rotational speed of the pedal shaft 25. The current rider pedaling energy is calculated from the pedaling shaft torque and the pedaling shaft rotational speed, which is continuously stored in a rider pedaling energy monitor 43 of the control unit 40.

The drive unit 20 has an inclination sensor 42 within the drive unit housing 22 that is mechanically fixed to the drive unit 20. The inclination sensor 42 is individually adjusted to the installation position of the drive unit 20 at the bicycle frame 18 and detects the inclination A of the contact plane 11 of the bicycle 10 or of the drive unit 20 in relation to the horizontal plane 11' in the longitudinal direction of the bicycle 10.

The drive unit 20 further comprises a housing temperature sensor 32 within the drive unit housing 22 which is thermally coupled directly to the drive unit housing 22 and which detects the current housing temperature Th of the drive unit 20. The housing temperature sensor 32 is mounted on a drive unit housing sidewall 22' that lies approximately in a longitudinal plane of the bicycle 10 and that is adjacent or is neighbored to a pedal crank 242.

The drive unit 20 further comprises a motor temperature sensor 33 which is mounted in or on the drive motor 30 for detecting the motor temperature. The motor temperature can here be understood as the temperature of the motor coils, but can alternatively also be understood as the housing temperature of the drive motor 30.

All sensors 32, 33, 42, 52 of the drive unit 20 are informationally connected to the drive control 50 or to the housing temperature control module 51 via corresponding signal lines.

The control unit 40 has a display 41 and two buttons 451, 452 for increasing and decreasing the general drive support level of a basic control.

The control unit 40 further comprises a location receiver 49 and a trip profile memory 48. The location receiver 49 is in this case a GPS receiver with which the current location is determined with the best possible accuracy. The control unit 40 also has a navigation program in which the rider can enter his/her/its destination and select a route from several route suggestions. The altitude profile H for the following 30 minutes is, for example, determined and stored in the trip profile memory based on the route selected by the rider, the route profile generated therefrom, and the current location. The entire trip profile and the future altitude profile H are stored in the trip profile memory 48. The altitude profile H is not an absolute altitude profile, but a relative altitude profile in which the altitude zero is assigned for the current location. This is because the altitude profile H is used solely to estimate the future drive energy requirement.

The control unit 40 comprises a speed detector 46 that signalizes the current bicycle speed V. The current bicycle speed V can be provided, for example, by the location receiver 49, but can also be determined from the pedal shaft speed and the total transmission ratio or by a wheel-side speed sensor on the front or rear wheel.

The control unit 40 further comprises an ambient temperature detector 44 in the form of a temperature sensor that measures the current local ambient air temperature Tair. The current local ambient temperature Tair at the bicycle location can alternatively also be obtained wirelessly via the Internet.

The control unit 40 finally has a rider pedaling performance monitor 43 in which the past rider pedaling performance is stored over time or over distance. The rider pedaling energy is determined with the aid of the pedal shaft torque sensor 52.

The bottom bracket drive of the present invention works as follows:

Before starting the trip, the rider enters a destination into the control unit 40 and selects the desired route from the route suggestions subsequently offered for selection, from which the entire route profile and the immediately upcoming relative altitude profile H are derived, which is stored in the trip profile memory 48.

The degree of assistance of the drive unit 20 according to a basic control is selected from, for example, five graduated degrees of assistance with the aid of the buttons 451, 452. The respective degree of assistance can, for example, be set linearly proportional to the rider pedaling energy or the rider torque.

Figure 3:
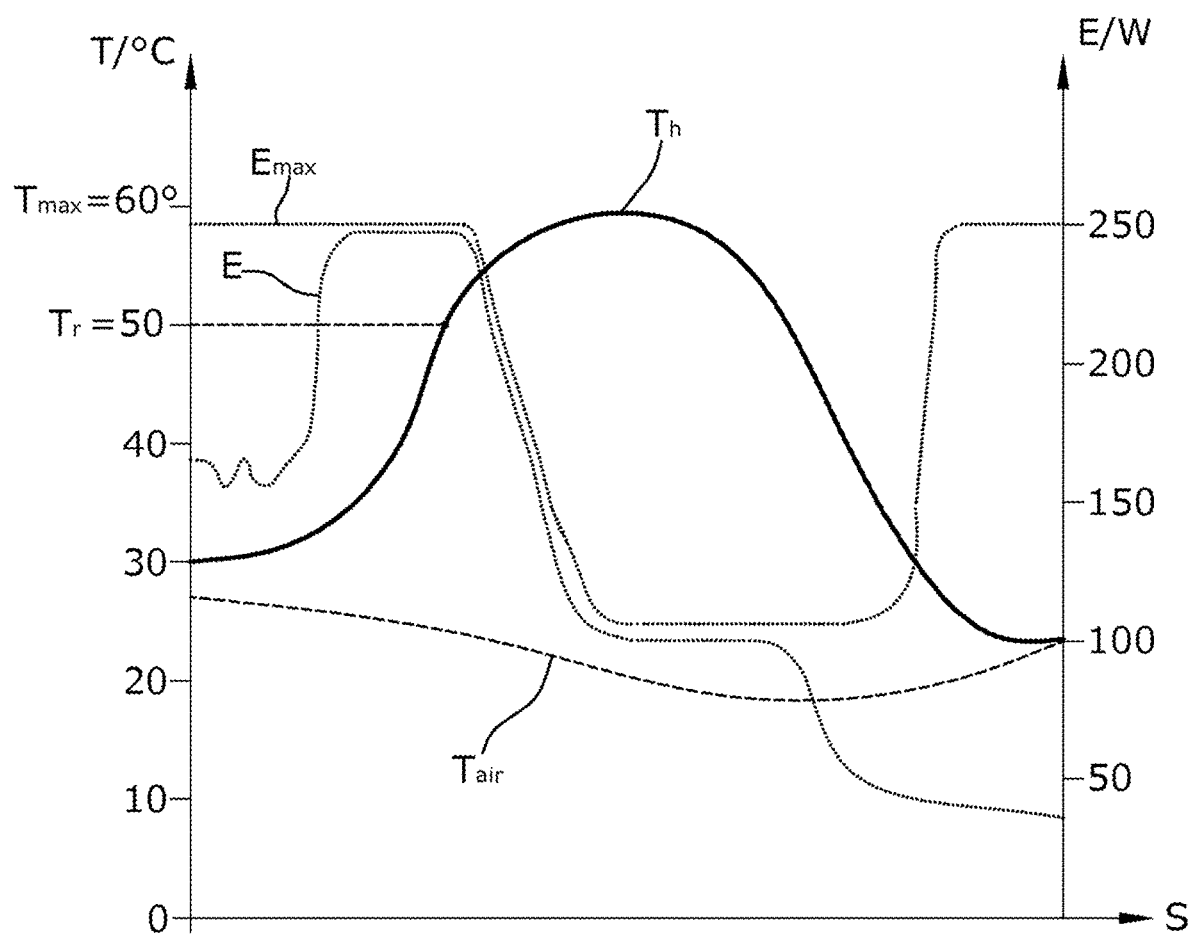
FIG. 3 shows a temperature-energy diagram.

The housing temperature control module 51 continuously checks whether the housing temperature Th is above a control intervention limit temperature Tr of 50° C. in this case. As long as the housing temperature Th of the drive unit 20 is not above the control intervention limit temperature Tr, there is no intervention in the basic control in the form of a limitation of the maximum electrical drive energy Emax to below 250 W, with which the drive control 50 supplies the drive motor 30 with electrical energy. If the housing temperature Th rises above 50° C., the housing temperature control module 51 intervenes and limits the maximum electrical drive energy Emax, as can be seen in the diagram in FIG. 3. This intervention overrules or limits the basic control. The torque-generating current can alternatively be limited accordingly. This indirectly limits the energy.

From the point at which the housing temperature Th exceeds 50° C., the permissible maximum electrical drive energy Emax for the basic control is successively reduced from 250 W to 100 W in order to slow down or reduce the increase in the heating of the housing temperature Th. The degree of limitation of the maximum electrical drive energy Emax is directly influenced by the local ambient air temperature Tair. The lower the local ambient air temperature Tair, the higher the maximum electrical drive energy Emax. In the diagram in FIG. 3, for example, a local ambient air temperature Tair of 26.6° C. is assumed at the beginning. As the bicycle then rides up an incline, the actual drive energy E increases to 250 W until the thermal energy loss in the drive unit 20 causes the housing temperature Th to rise to 50° C. and beyond. The increasing elevation of the bicycle affects the course of the local ambient air temperature Tair, which decreases with increasing altitude, which is exaggeratedly shown in FIG. 3. The maximum electrical drive energy Emax is, however, in principle always limited as a function of the local ambient air temperature Tair. The maximum electrical drive energy Emax is set relatively high at relatively low local ambient air temperatures Tair, and is set relatively low at relatively high local ambient air temperatures Tair, since the cooling performance with respect to the drive unit housing 22 is significantly degraded at high local ambient air temperatures Tair. The current bicycle speed V is also included in determining the maximum electrical drive energy Emax.

The housing temperature control module 51 also obtains the past pedaling energy history of the respective rider from the rider pedaling energy monitor 43. This can, for example, be the pedaling energy history of the past 30 minutes from which, for example, a pedaling energy average value can be calculated. The higher the pedaling energy of the rider in question, the lower the maximum electrical drive energy Emax is set, as it is assumed that more total electrical energy will be demanded and provided by the basic control integrated over time than with a lower historical pedaling energy average value.

The housing temperature control module 51 further receives the current inclination A of the bicycle 10 from the inclination sensor 42, from which conclusions can also be drawn about the future drive energy demand. In the case of a bicycle incline, it is assumed that a relatively high electrical drive energy is constantly demanded by the basic control, so that the maximum electrical drive energy Emax is set lower than if the current incline A is, for example, 0°, i.e., the bicycle is moved in the plane, for which a high drive energy will be demanded at most shortly via the basic control.

The housing temperature control module 51 obtains the future elevation profile H from the trip profile memory 48. A true predictive control can hereby be realized so that the convergence of the housing temperature Th to the housing limit temperature Tmax is refined so that the housing limit temperature Tmax is only reached when no more energy-consuming increase is to be subsequently expected. The housing temperature control module 51 in any case limits the maximum electrical drive energy Emax as a function of the future height profile H.

The housing temperature control module 51 may alternatively be located in the control unit 40.

The present invention is not limited to embodiments described herein; reference should be had to the appended claims.

LIST OF REFERENCE NUMERALS

10 Bicycle
11 Contact plane
11' Horizontal plane
12 Rear wheel
13 Front wheel
14 Rear sprocket
16 Bicycle chain
18 Bicycle frame
20 Drive unit
22 Drive unit housing
22' Drive unit housing sidewall
25 Pedal shaft
26 Chainring
30 Drive motor
32 Housing temperature sensor
33 Motor temperature sensor
40 Control unit
41 Display
42 Inclination sensor
43 Rider pedaling energy monitor
44 Ambient temperature detector
46 Speed detector
48 Trip profile memory
49 Location receiver
50 Drive control
51 Housing temperature control module
52 Pedal shaft torque sensor
241 Pedal crank
242 Pedal crank
451 Button
452 Button
A Inclination
Emax Maximum electrical drive energy
H Altitude profile
Tair Local ambient air temperature
Th Housing temperature
Tmax Housing limit temperature
Tr Control intervention limit temperature
V Bicycle speed

What is claimed is:

1. An electric pedelec bottom bracket drive for a bicycle, the electric pedelec bottom bracket drive comprising:
    a drive unit comprising,
        a drive unit housing,
        a supporting electric drive motor arranged in the drive unit housing, and
        a housing temperature sensor which is thermally associated with the drive unit housing, the housing temperature sensor being configured to measure a housing temperature;
    a drive controller which is configured to supply electrical drive energy to the supporting electric drive motor, the drive controller comprising a housing temperature control module which is connected to the housing temperature sensor and which is configured to control an electrical drive energy so that a housing limit temperature is not exceeded; and
    an ambient temperature detector arranged outside of the drive unit housing and connected to the housing temperature control module, the ambient temperature detector being configured to detect an air temperature outside the drive unit housing,
    wherein,
    the housing temperature control module is configured to limit a maximum electrical drive energy as a function of the air temperature when the housing temperature measured by the housing temperature sensor is above a control intervention limit temperature which is below the housing limit temperature.

2. The electric pedelec bottom bracket drive as recited in claim 1, wherein the control intervention limit temperature is at least 5 Kelvin below the housing limit temperature.

3. The electric pedelec bottom bracket drive as recited in claim 1, wherein the control intervention limit temperature is at least 10 Kelvin below the housing limit temperature.

4. The electric pedelec bottom bracket drive as recited in claim 1, wherein the housing limit temperature is above 50° C.

5. The electric pedelec bottom bracket drive as recited in claim 1, wherein the housing limit temperature is above 60° C.

6. The electric pedelec bottom bracket drive as recited in claim 1, wherein,
- the drive unit further comprises an inclination sensor which is configured to measure an inclination of a contact plane of the drive unit to a horizontal plane in a longitudinal direction of the bicycle, and
- the housing temperature control module is connected to the inclination sensor and is further configured to limit the maximum electrical drive energy as a function of the inclination.

7. The electric pedelec bottom bracket drive as recited in claim 6, further comprising:
- a location receiver; and
- a trip profile memory which is configured to store a future elevation profile, wherein,
the housing temperature control module is connected to the inclination sensor and is further configured to limit the maximum electrical drive energy based on the future altitude profile.

8. The electric pedelec bottom bracket drive as recited in claim 1, further comprising:
- a rider pedaling energy monitor which is configured to store a pedal energy history, wherein,
- the drive unit further comprises a pedal shaft torque sensor, and
- the housing temperature control module is further connected to the rider pedaling energy monitor and is further configured to limit the maximum electrical drive energy in response to the pedal energy history.

\* \* \* \* \*